United States Patent
Noujeim

(10) Patent No.: US 11,269,048 B2
(45) Date of Patent: Mar. 8, 2022

(54) RADAR SENSOR ARRAY FOR INTERFERENCE HUNTING AND DETECTION

(71) Applicant: Baidu USA LLC, Sunnyvale, CA (US)

(72) Inventor: Karam Noujeim, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 467 days.

(21) Appl. No.: 16/168,577

(22) Filed: Oct. 23, 2018

(65) Prior Publication Data

US 2020/0124698 A1 Apr. 23, 2020

(51) Int. Cl.
*G01S 7/02* (2006.01)
*G01S 13/931* (2020.01)
*H01Q 1/32* (2006.01)

(52) U.S. Cl.
CPC ............ *G01S 7/023* (2013.01); *G01S 13/931* (2013.01); *H01Q 1/3233* (2013.01); *G01S 2013/9327* (2020.01)

(58) Field of Classification Search
CPC .................. G01S 7/023; G01S 13/931; G01S 2013/9327; H01Q 1/3233
See application file for complete search history.

(56) References Cited

U.S. PATENT DOCUMENTS

| | | | |
|---|---|---|---|
| 2007/0032245 A1* | 2/2007 | Alapuranen | G08G 1/161 455/456.1 |
| 2016/0291120 A1* | 10/2016 | Rastegar | G01S 13/751 |
| 2016/0363660 A1* | 12/2016 | Gudim | G01S 7/021 |
| 2018/0074153 A1* | 3/2018 | Bowden | G01S 3/465 |
| 2020/0049511 A1* | 2/2020 | Sithiravel | G01C 21/28 |

* cited by examiner

*Primary Examiner* — Donald H B Braswell
(74) *Attorney, Agent, or Firm* — Womble Bond Dickinson (US) LLP

(57) ABSTRACT

A radar sensing system for an autonomous driving vehicle (ADV) is disclosed. The system comprises a number of radar sensors operable to detect radio waves emitted from one or more objects in proximity of the ADV. Each of the radar sensors includes one or more antennas to receive the radio waves and to convert the radio waves into respective antenna output signals. The system further comprises a signal processor configured to determine a number of angles of arrival associated with the radio waves responsive to the antenna output signals, and to provide object location information based on the angles of arrival. The object location information includes a location of each of the one or more objects.

16 Claims, 8 Drawing Sheets

US 11,269,048 B2

RADAR SENSOR ARRAY FOR INTERFERENCE HUNTING AND DETECTION

TECHNICAL FIELD

Embodiments of the present disclosure relate generally to radar systems. More particularly, embodiments of the disclosure relate to radar sensor array for interference hunting and detection.

BACKGROUND

Vehicles operating in an autonomous mode (e.g., driverless) can relieve occupants, especially the driver, from some driving-related responsibilities. When operating in an autonomous mode, the vehicle can navigate to various locations using an onboard sensor system, allowing the vehicle to travel with minimal human interaction or in some cases without any passengers. The sensor system includes, among other things, one or more cameras, global positioning system (GPS), an inertial measurement unit (IMU), and a light detection and range (LIDAR) unit to track its surroundings (e.g., other vehicles, pedestrians, buildings, traffic signs, etc.). The sensor system also includes a radar (also referred to as radio detection and ranging) unit, which is an object-detection system that uses radio waves to determine, for example, the range, angle, or velocity of objects.

Radars have been used in many applications, including autonomous driving systems (e.g., autonomous vehicle). A radar consists of a transmitter, receiver, mixed-signal circuits, and a signal processing module. By transmitting an electromagnetic signal toward an object and receiving the reflected signal back, radar has been utilized for measuring the distance and speed of objects within an environment. While an automotive radar's receiver has been used to measure signals reflected from objects, it has not been utilized to receive/detect/sense signals transmitted by other radars. Detection of such signals is key to locating these radars and thus the vehicles or objects on which they are mounted.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
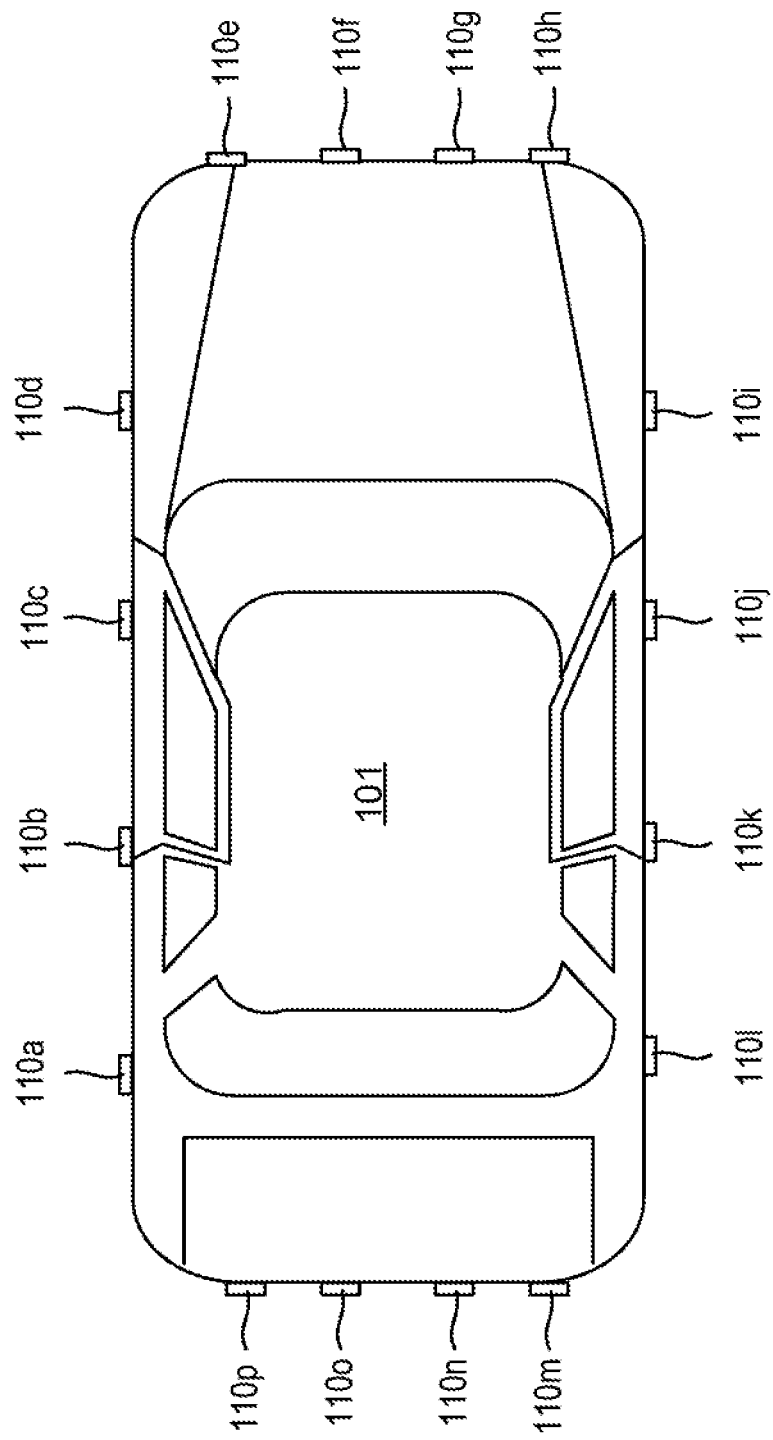
FIG. 1 is a top view of a vehicle having a radar sensing system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure use an array of radar sensors (or receivers) disposed at a number of locations of an autonomous driving vehicle (ADV), with each radar sensor being position with a particular direction. In one embodiment, the radar sensors are configured to detect and receive radar signals emitted from other radar sources, such as other ADVs. By detecting and receiving the radar signals, the ADV can determine the source of radar signal interferences, and in turn, determine the locations of the other radar sources, e.g., other ADVs. The locations of other radar sources can be used to determine where objects are located in a driving environment for perception and planning purposes. In this way, an optimal path or route can be generated to operate the ADV, thereby increasing safety (e.g., collision avoidance) while operating the ADV within the driving environment.

In one embodiment, a radar sensing system comprises a number of radar sensors operable to detect radio waves emitted from one or more objects in proximity of the ADV. Each of the radar sensors includes one or more antennas to receive the radio waves and to convert the radio waves into respective antenna output signals. The system further comprises a signal processor configured to determine a number of angles of arrival associated with the radio waves responsive to the antenna output signals, and to provide object location information based on the angles of arrival. The object location information includes a location of each of the one or more objects.

In one embodiment, the signal processor is further configured to apply an angle of arrival (AoA) estimation algorithm based on the antenna output signals in order to determine the plurality of angles of arrival and to provide the object location information. In one embodiment, the antenna(s) are omnidirectional antennas, an array antenna, phased array antenna, passive phased array antenna, or active phased array antenna. In one embodiment, the AoA estimation algorithm is a multiple signal classification (MUSIC) algorithm, or an estimation of signal parameters via rotational invariance technique (ESPRIT) algorithm. In one embodiment, the radar sensors are disposed in at least one of the following regions of the ADV: a front region, a back region, a left region, or a right region.

FIG. 1 is a top view of a vehicle having a radar sensing system according to one embodiment. Referring to FIG. 1, a sensing system or radar sensing system may include a number of radar sensors (or radar sensing devices) 110*a-p* mounted to autonomous driving vehicle 101. In one embodiment, each of radar sensors 110*a-p* may be a passive radar sensor that detects and tracks objects (e.g., other vehicles) in an environment by detecting and processing electromagnetic (EM) radio waves or signals transmitted from those objects.

Such radio waves, for example, may be transmitted from radar units of the objects. Depending on the design and physical features of vehicle 101, radar sensors 110a-p may be disposed or positioned at any regions of vehicle 101 (e.g., front/back bumper, doors, side skirts, fenders, roof, trunk, etc.), with each radar sensor being positioned with a particular direction. In the example of FIG. 1, radar sensors 110a-p are disposed around vehicle 101. As shown, a first subset of radar sensors 110a-p (e.g., radar sensors 110e-h) may be disposed at a front bumper of vehicle 101 (e.g., within or on the front bumper), a second subset (e.g., radar sensors 110m-p) may be disposed at a rear bumper of vehicle 101 (e.g., within or on the rear bumper), a third subset (e.g., radar sensors 110a-d) may be disposed at a left side of vehicle 101 (e.g., left side skirt, door, fender, etc.), a fourth subset (e.g., radar sensors 110i-l) may be disposed at a right side of vehicle 101 (e.g., right side skirt, door, fender, etc.), and so on.

It should be noted that the radar sensors in each of the subsets may be position with the same direction or different directions from one another. It should also be noted that while FIG. 1 illustrates sixteen radar sensors 110a-p, any number of radar sensors may be included in the sensing system and those radar sensors may be arranged in any configuration within vehicle 101.

Figure 2:
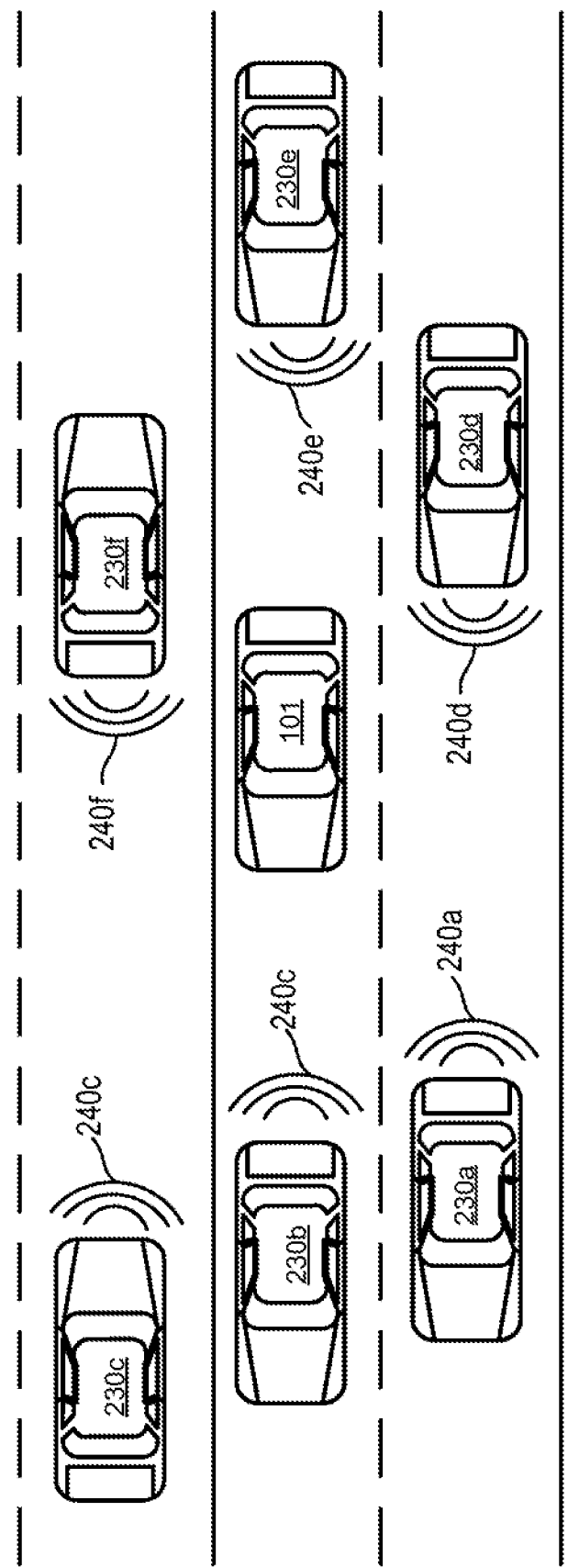
FIG. 2 is a diagram illustrating a vehicle operating within a driving environment.

Referring now to FIG. 2, vehicle 101 may be operated within a driving environment (e.g., street, highway, etc.) which include surrounding vehicles 230a-f. Each of vehicles 230a-f may be located anywhere around (or in proximity of) vehicle 101, and may be equipped with a radio frequency (RF) emitting device (e.g., radar unit). As shown, vehicles 230a-f (e.g., vehicles operating in manual mode, a full autonomous mode, or a partial autonomous mode) may respectively emit EM radio waves 240a-f at different or same frequencies using its respective radar unit. Each radar sensor 110a, 110b, . . . , 110p of vehicle 101 may operate at a sensor frequency ($F_s$) to detect radio waves 240a-f. In one embodiment, some or all of radar sensors 110a-p may be tuned to operate at different sensor frequencies, though they may be tuned to operate at the same sensor frequency. In one embodiment, the sensing frequency of each radar sensor 110a, . . . , 110p may be set to any desired frequency, and may be based on a number of factors, such as the event the sensor is attempting to detect (e.g., object's movement), the conditions of the sensing, the range of the radar, etc. In one embodiment, the sensing frequency may be narrowband, wideband, or ultra-wide band.

Based on the radio waves 240a-f respectively detected from vehicles 230a-f, vehicle 101 may determine the location (or position), heading, speed, etc. of each vehicle. For example, the sensing system may process each of the radio waves 240a-f (e.g., using a beamforming technique) for directional signal reception. That is, the sensing system may process radio waves 240a-f to determine or calculate amplitude ($A_i$) and phase ($ø_i$) of each radio wave 240a, . . . , 240f. Using the amplitude and/or phase, the sensing system may measure for example a direction or angle of arrival and/or Doppler shift of the radio wave. Based on this measured information, the sensing system may calculate the location, heading, speed, etc. of vehicles 230a-f.

Figure 3:
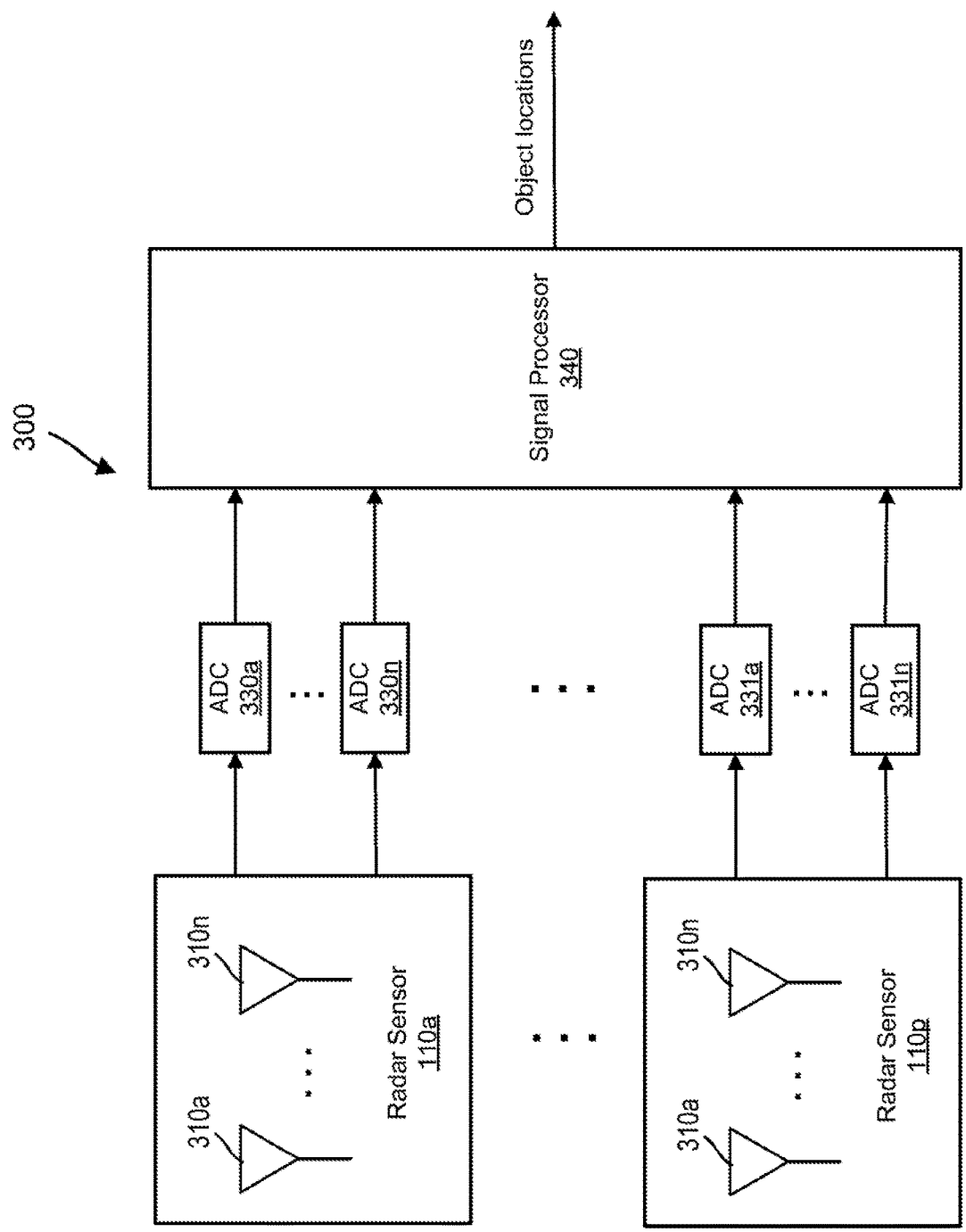
FIG. 3 is a block diagram illustrating a radar sensing system according to one embodiment.

FIG. 3 is a block diagram illustrating a radar sensing system according to one embodiment. Referring to FIG. 3, radar sensing system 300 may include radar sensors 110a-p, one or more analog-to-digital (ADC) converters 330a-n, and a signal processor 340. In one embodiment, system 300 may be incorporated in an autonomous vehicle, such as vehicle 101 of FIG. 1.

As shown, each radar sensor 110a, . . . , 110p may include one or more antennas (or antenna elements) 310a-n. Antennas 310a-n may be configured as omnidirectional antennas, an array antenna, phased array antenna, passive phased array (also referred to as passive electronically scanned array (PESA)) antenna, or active phased array (also referred to as active electronically scanned array (AESA)) antenna. In one embodiment, antennas 310a-n may be uniform or non-uniform (e.g., sparse antenna array). It should be noted that while FIG. 3 shows each of the radar sensors 110a-p including antennas 310a-n, the radar sensors may include a different or same number of antennas from one another.

With continued reference to FIG. 3, each of antennas 310a-n may detect or receive radio waves transmitted from surrounding obstacles (e.g., vehicles equipped with radar units) at different or same frequencies. The detected radio waves are converted into an antenna output signal, which carries a signal signature. In one embodiment, the signal signature may be determined based on the amplitude and phase of the output signal. Accordingly, in the example of FIG. 3, as each antenna 310a, . . . , 310n produces an output signal from its detected radio waves, n number of output signals may be produced from each radar sensor 110a, . . . 110p (where n is an integer greater than or equal to 1), thereby producing different combinations of antenna output signals. In one embodiment, the antenna output signals may be provided to respective ADC converters 330a-n and 331a-n to convert into digital signals. In another embodiment, ADC converters 330a-n and 331a-n may be optional, and as such, the antenna output signals may be used for subsequent processing. In one embodiment, the antenna output signals may be provided to respective amplifiers (not shown) to amplify the signals prior to providing the signals to the ADC converters 330a-n and 331a-n, or prior to processing.

Based on the converted digital signals (or antenna output signals), signal processor 340 may determine the sources of radio (or radar) signal interferences. That is, signal processor 340 may identify the angle of arrival (AoA) of the detected radio waves, for example, by measuring the time difference of arrival (TDOA) at each antenna. TDOA (also referred to as multilateration) is a technique for geo-locating RF sources or emitters. The TDOA measurement may be made by measuring the difference in received phase at each antenna. AoA refers to a direction of propagation of a radio or RF wave incident on an antenna array (e.g., antennas 310a-n). By knowing the AoA of the radio waves, signal processor 340 may determine the locations of the objects (e.g., vehicles 230a-f of FIG. 2) from which the radio waves are transmitted. In one embodiment, signal processor 340 may implement or apply an AoA estimation algorithm using the digital signals (or antenna output signals) to determine the locations, such as, for example, multiple signal classification (MUSIC) or estimation of signal parameters via rotational invariance technique (ESPRIT). These algorithms are generally known to people of ordinary skill in the art. In one embodiment, the locations of the objects (or object location information) may be provided to a perception and planning system of an autonomous vehicle (e.g., vehicle 101 of FIG. 1) to apply motion planning and control of the vehicle. In this way, interference among objects and the vehicle can be detected to avoid potential collisions.

Figure 4A:
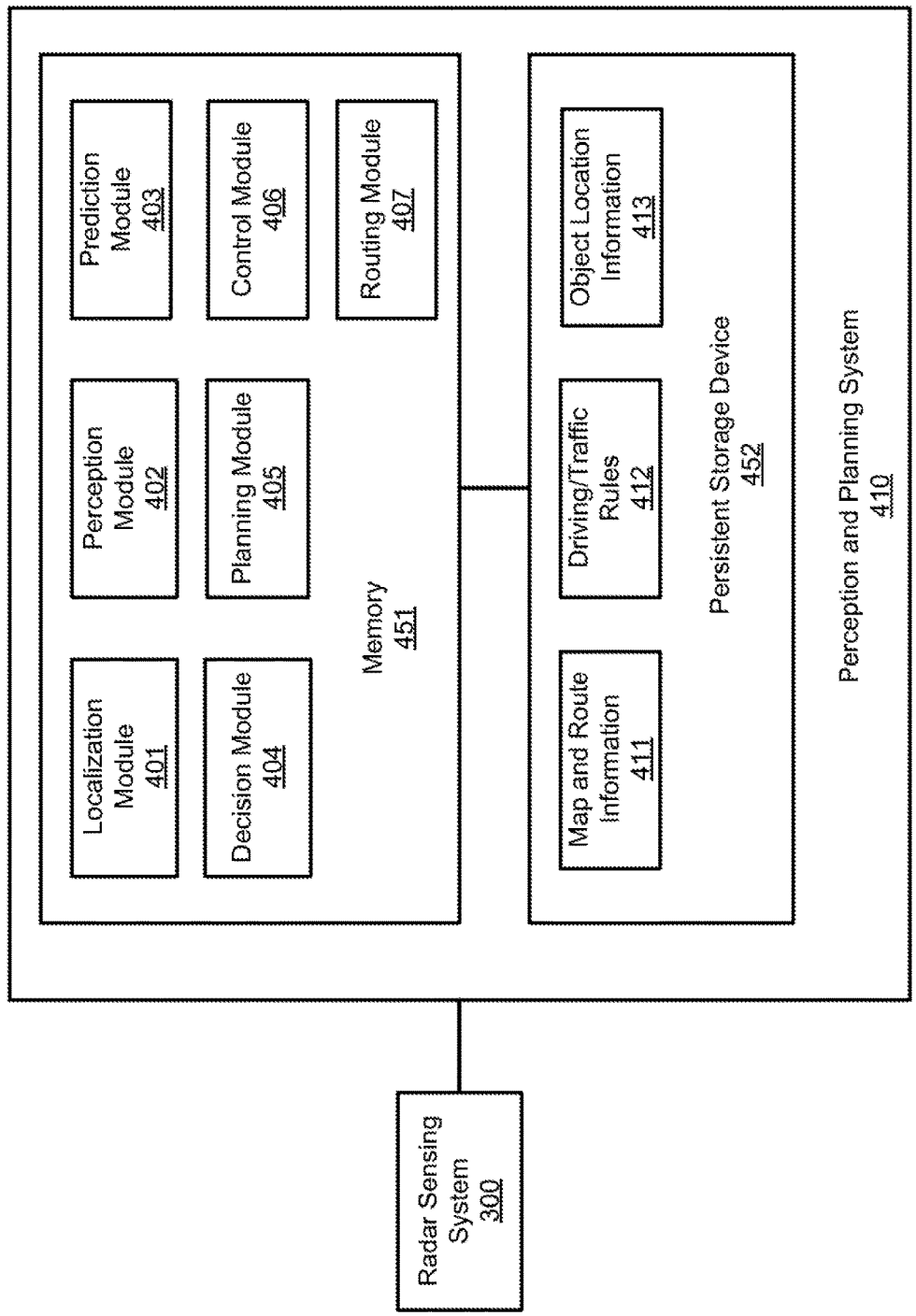
FIGS. 4A-4B is a block diagram illustrating an example of a perception and planning system used with an autonomous vehicle according to one embodiment.
Figure 4B:
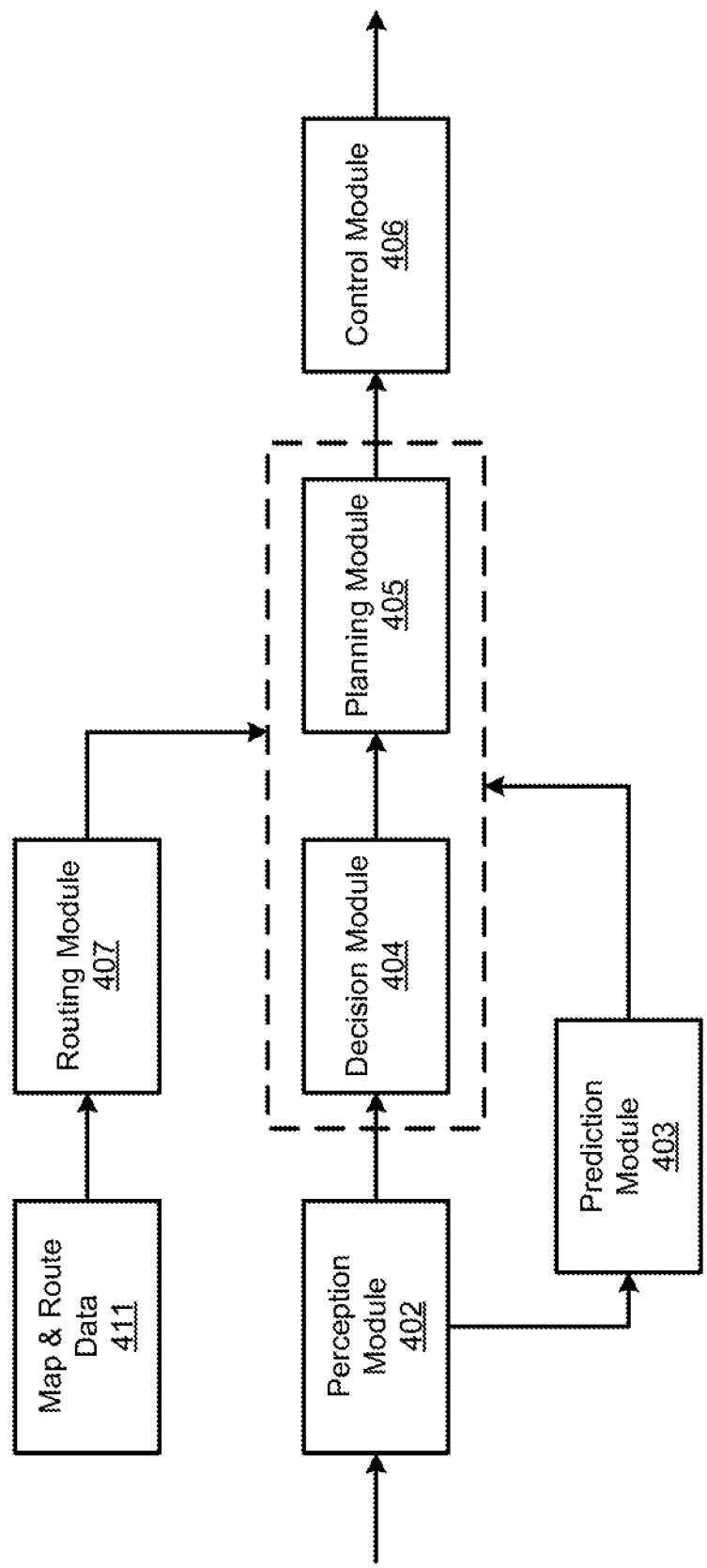

FIGS. 4A-4B is a block diagram illustrating an example of a perception and planning system used with an autonomous vehicle according to one embodiment. In one embodiment, system 400 may be implemented as a part of autonomous vehicle 101 of FIG. 1.

Referring to FIGS. 4A-4B, perception and planning system 410 includes, but is not limited to, localization module 401, perception module 402, prediction module 403, decision module 404, planning module 405, control module 406, routing module 407.

Some or all of modules 401-407 may be implemented in software, hardware, or a combination thereof. For example, these modules may be installed in persistent storage device 452, loaded into memory 451, and executed by one or more processors (not shown). Note that some of modules 401-407 may be integrated together as an integrated module.

Localization module 401 determines a current location of autonomous vehicle 101 and manages any data related to a trip or route of a user. Localization module 401 (also referred to as a map and route module) manages any data related to a trip or route of a user. A user may log in and specify a starting location and a destination of a trip, for example, via a user interface. Localization module 401 communicates with other components of autonomous vehicle 101, such as map and route information 411, to obtain the trip related data. For example, localization module 401 may obtain location and route information from a location server and a map and POI (MPOI) server. A location server provides location services and an MPOI server provides map services and the POIs of certain locations, which may be cached as part of map and route information 411. While autonomous vehicle 101 is moving along the route, localization module 401 may also obtain real-time traffic information from a traffic information system or server.

Based on the sensor data provided by a sensor system of vehicle 101 (not shown), localization information obtained by localization module 401, and object location information 413 provided by radar sensing system 300 (as previously described) and stored in persistent storage device 452, a perception of the surrounding environment is determined by perception module 402. Object location information 413 may include a location of each object within a proximity of vehicle 101. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 402 may include a computer vision system or functionalities of a computer vision system to process and analyze images captured by one or more cameras in order to identify objects and/or features in the environment of autonomous vehicle. The objects can include traffic signs, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, the distance of objects, etc. (e.g., using object location information 413). Perception module 402 can also detect objects based on other sensors data provided by other sensors such as a radar and/or light detection and ranging (LIDAR).

For each of the objects, prediction module 403 predicts what the object will behave under the circumstances. The prediction is performed based on the perception data perceiving the driving environment at the point in time in view of a set of map/route information 411 and traffic rules 412. For example, if the object is a vehicle at an opposing direction and the current driving environment includes an intersection, prediction module 403 will predict whether the vehicle will likely move straight forward or make a turn. If the perception data indicates that the intersection has no traffic light, prediction module 403 may predict that the vehicle may have to fully stop prior to enter the intersection. If the perception data indicates that the vehicle is currently at a left-turn only lane or a right-turn only lane, prediction module 403 may predict that the vehicle will more likely make a left turn or right turn respectively.

For each of the objects, decision module 404 makes a decision regarding how to handle the object. For example, for a particular object (e.g., another vehicle in a crossing route) as well as its metadata describing the object (e.g., a speed, distance, direction, turning angle, which may be determined based on object location information 413), decision module 404 decides how to encounter the object (e.g., overtake, yield, stop, pass). Decision module 404 may make such decisions according to a set of rules such as traffic rules or driving rules 412, which may be stored in persistent storage device 452.

Routing module 407 is configured to provide one or more routes or paths from a starting point to a destination point. For a given trip from a start location to a destination location, for example, received from a user, routing module 407 obtains route and map information 411 and determines all possible routes or paths from the starting location to reach the destination location. Routing module 407 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 404 and/or planning module 405. Decision module 404 and/or planning module 405 examine all of the possible routes to select and modify one of the most optimal routes in view of other data provided by other modules such as traffic conditions from localization module 401, driving environment perceived by perception module 402, and traffic condition predicted by prediction module 403. The actual path or route for controlling the ADV may be close to or different from the reference line provided by routing module 407 dependent upon the specific driving environment at the point in time.

Based on a decision for each of the objects perceived, planning module 405 plans a path or route for the autonomous vehicle, as well as driving parameters (e.g., distance, speed, and/or turning angle), using a reference line provided by routing module 407 as a basis. That is, for a given object, decision module 404 decides what to do with the object, while planning module 405 determines how to do it. For example, for a given object, decision module 404 may decide to pass the object, while planning module 405 may determine whether to pass on the left side or right side of the object. Planning and control data is generated by planning module 405 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 406 controls and drives the autonomous vehicle 101, by sending proper commands or signals to a control system of the vehicle, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 405 plans a next route segment or path segment, for example, including a target position and the time required for the ADV to reach the target position. Alternatively, planning module 405 may further specify the specific speed, direction, and/or steering angle, etc. In one embodiment, planning module 405 plans a route segment or path segment for the next predetermined period of time such as 5 seconds. For each planning cycle, planning module 405 plans a target position for the current cycle (e.g., next 5 seconds) based on a target position planned in a previous cycle. Control module 406 then generates one or more control commands (e.g., throttle, brake, steering control commands) based on the planning and control data of the current cycle.

Note that decision module 404 and planning module 405 may be integrated as an integrated module. Decision module 404/planning module 405 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via a user interface system (not shown). The navigation system may update the driving path dynamically while the autonomous vehicle is in operation. The navigation system can incorporate data from a GPS system (also not shown) and one or more maps so as to determine the driving path for the autonomous vehicle.

Figure 5:
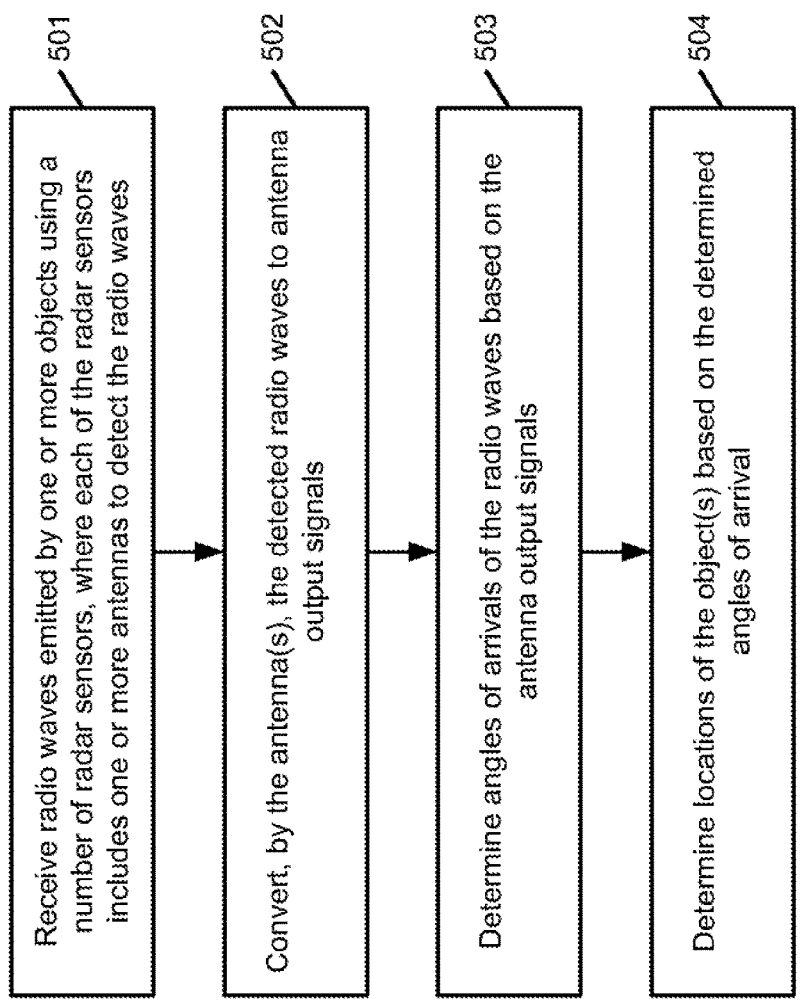
FIG. 5 is a flow diagram illustrating a method for a radar sensing system according to one embodiment.

FIG. 5 is a flow diagram illustrating a method for a radar sensing system according to one embodiment. In one embodiment, method 500 may be performed by radar sensing system 300 of FIG. 3 and may be performed in any desired environment.

At block 501, radio waves emitted by one or more objects are received using a number of radar sensors (e.g., radar sensors 110*a-p* of FIG. 1). Each of the radar sensors includes one or more antennas to detect the radio waves. At block 502, the received radio waves are converted, by the antenna(s), to antenna output signals (e.g., electrical signals). At block 503, angles of arrival of the radio waves are determined based on the antenna output signals. At block 504, locations of the objects are determined based on the angles of arrival.

Figure 6:
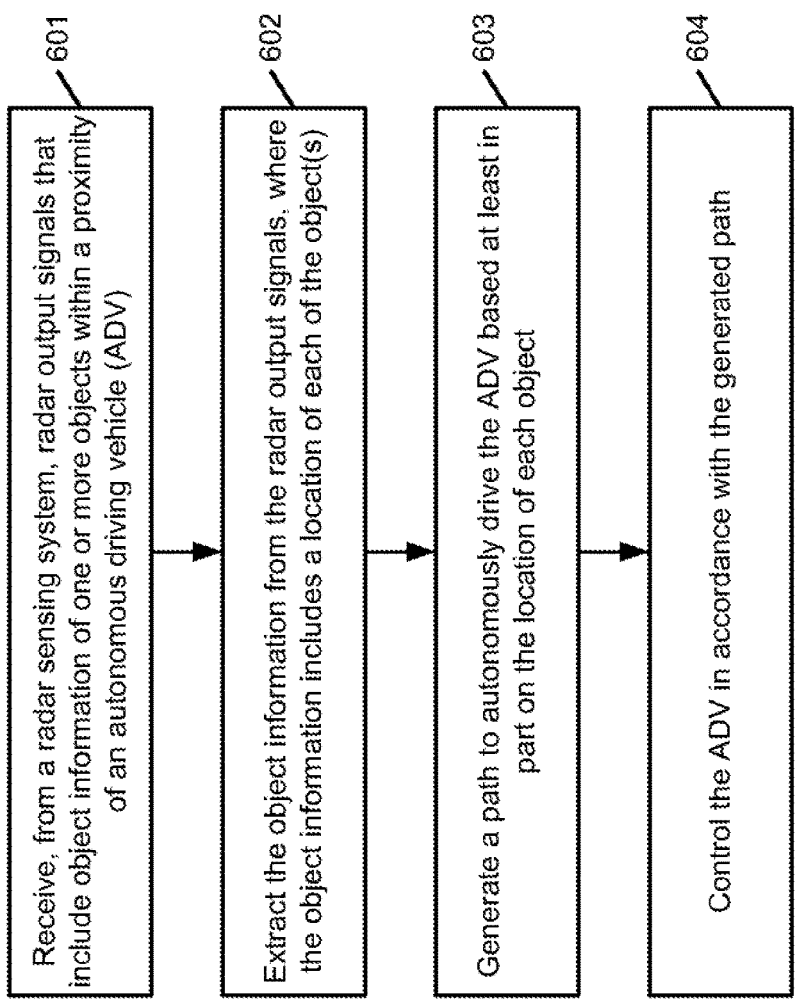
FIG. 6 is a flow diagram illustrating a method of operating an autonomous vehicle according to one embodiment.

FIG. 6 is a flow diagram illustrating a method of operating an autonomous vehicle according to one embodiment. Process 600 may be performed by processing logic which may include software, hardware, or a combination thereof. For example, process 600 may be performed by the perception and planning system 410 of FIG. 4A.

Referring to FIG. 6, at block 601, the processing logic receives, from a radar sensing system (e.g., system 300), radar output signals that include object information of one or more objects within a proximity of an autonomous driving vehicle (ADV). At block 602, the processing logic extracts the object information from the radar output signals, where the object information includes a location of each of the object(s). At block 603, the processing logic generates a path to autonomously drive the ADV based at least in part on the location of each object. At block 604, the processing logic controls the ADV in accordance with the generated path.

Note that some or all of the components as shown and described above (e.g., signal processor 340) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
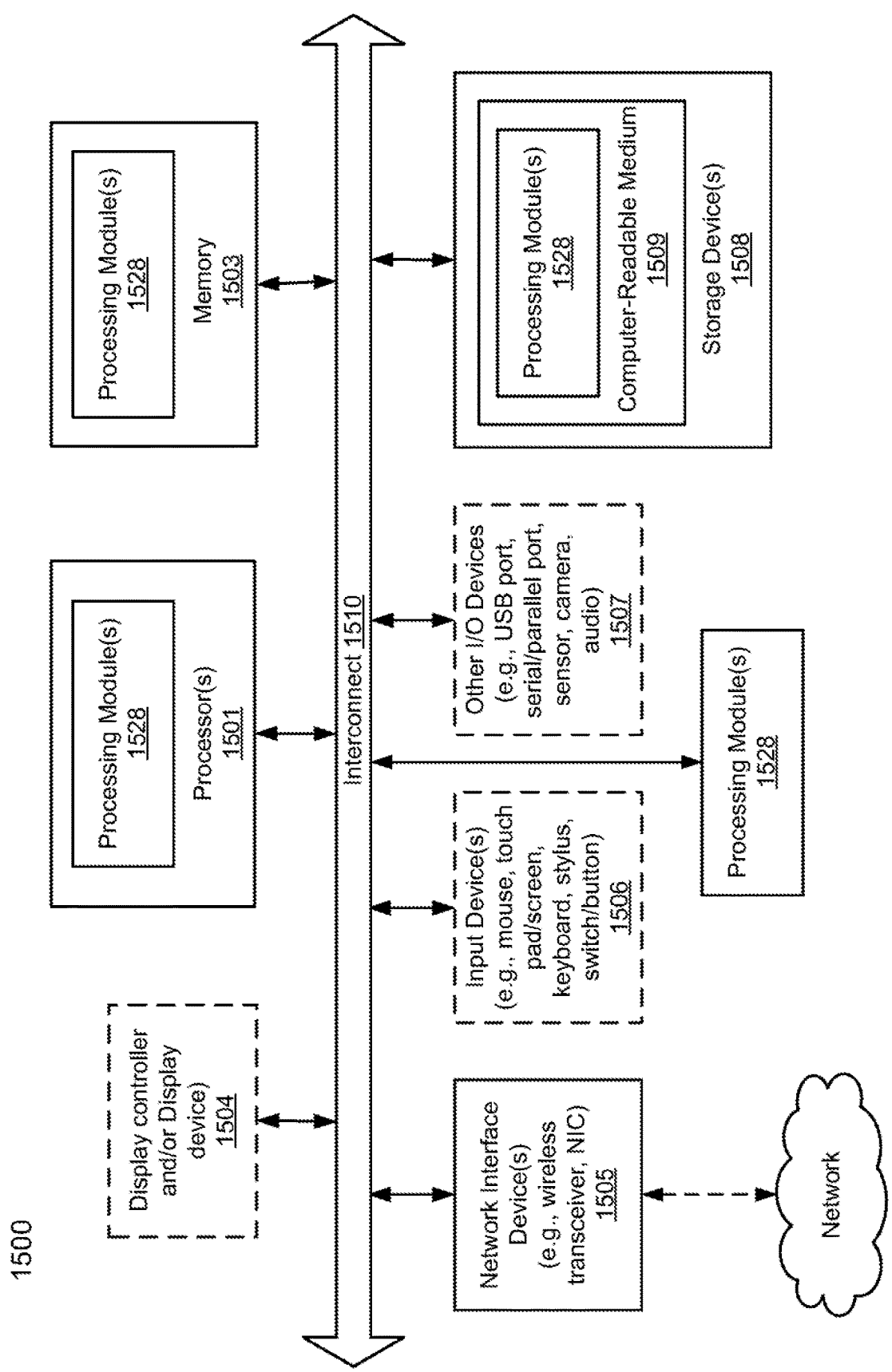
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 410 of FIG. 4A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other 10 devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, localization module 401, perception module 402, and prediction module 403. Processing module/unit/logic 1528 may also represent any module/unit/logic performed by the perception and planning system of the ADV. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system for an autonomous driving vehicle (ADV), the system comprising:
   a radar sensing system comprising:
      a plurality of radar receivers mounted on the ADV and operable to receive radar signals emitted from a plurality of radar sources, as opposed to radar reflected signals, in proximity of the ADV, wherein each of the radar receivers is positioned with a particular direction, and includes one or more antennas to receive the radar signals and to convert the radar signals into respective antenna output signals; and
      a signal processor configured to determine sources of radar signal interferences based on the antenna output signals and the particular directions of the radar receivers, and to provide location information of the radar sources based on the determined sources of radar signal interferences, wherein the location information includes a location of each radar source, wherein to determine the sources of radar signal interferences, the signal processor is configured to determine a phase of each of the antenna output signals; and
   an autonomous driving system comprising a processor and a memory coupled to the processor to store instructions, which when executed by the processor, cause the processor to:
      apply motion planning and control of the ADV based on the location information of the radar sources, while the ADV is operating in autonomous mode.

2. The system of claim 1, wherein to provide the location information of the radar sources, the signal processor is configured to apply an angle of arrival (AoA) estimation algorithm based on the determined sources of radar signal interferences.

3. The system of claim 1, wherein the one or more antennas are omnidirectional antennas, an array antenna, phased array antenna, passive phased array antenna, or active phased array antenna.

4. The system of claim 2, wherein the AoA estimation algorithm is a multiple signal classification (MUSIC) algorithm, or an estimation of signal parameters via rotational invariance technique (ESPRIT) algorithm.

5. The system of claim 1, wherein the plurality of radar receivers are disposed in at least one of the following regions of the ADV: a front region, a back region, a left region, or a right region.

6. The system of claim 5, wherein a first subset of the radar receivers is disposed at the front region of the ADV and a second subset of the radar receivers is disposed at the back region of the ADV.

7. The system of claim 6, wherein a third subset of the radar receivers is disposed at the left region of the ADV and a fourth subset of the radar receivers is disposed at the right region of the ADV.

8. The system of claim 1, wherein to determine the sources of radar signal interferences, the signal processor is further configured to determine an amplitude of each of the antenna output signals.

9. A method for an autonomous driving vehicle (ADV), the method comprising:
receiving, by a plurality of radar receivers mounted on the ADV, radar signals emitted by a plurality of radar sources, as opposed to radar reflected signals, in proximity of the ADV, wherein each of the radar receivers is positioned with a particular direction, and includes one or more antenna elements to receive the radar signals;
converting, by the one or more antenna elements, the radar signals into respective antenna output signals;
determining, by a signal processor, sources of radar signal interferences based on the antenna output signals and the particular directions of the radar receivers, wherein determining the sources of radar signal interferences comprises determining a phase of each of the antenna output signals;
providing, by the signal processor, location information of the radar sources based on the determined sources of radar signal interferences, wherein the location information includes a location of each radar source; and
applying motion planning and control of the ADV based on the location information of the radar sources, while the ADV is operating in autonomous mode.

10. The method of claim 9, wherein: providing the location information of the radar sources comprises: applying, by the signal processor, an angle of arrival (AoA) estimation algorithm based on the determined sources of radar signal interferences.

11. The method of claim 9, wherein the one or more antenna elements are omnidirectional antennas, an array antenna, phased array antenna, passive phased array antenna, or active phased array antenna.

12. The method of claim 10, wherein the AoA estimation algorithm is a multiple signal classification (MUSIC) algorithm, or an estimation of signal parameters via rotational invariance technique (ESPRIT) algorithm.

13. The method of claim 9, wherein the plurality of radar receivers are disposed in at least one of the following regions of the ADV: a front region, a back region, a left region, or a right region.

14. The method of claim 13, wherein a first subset of the radar receivers is disposed at the front region of the ADV and a second subset of the radar receivers is disposed at the back region of the ADV.

15. The method of claim 14, wherein a third subset of the radar receivers is disposed at the left region of the ADV and a fourth subset of the radar receivers is disposed at the right region of the ADV.

16. The method of claim 9, wherein determining the sources of radar signal interferences further comprises determining an amplitude of each of the antenna output signals.

* * * * *